United States Patent
Redeker (10) Patent No.: US 10,974,563 B2
(45) Date of Patent: Apr. 13, 2021

(54) CONTROL OF A SUSPENSION COMPONENT OF A VEHICLE

(71) Applicant: AUDI AG, Ingolstadt (DE)

(72) Inventor: Michael Redeker, Reichertshofen (DE)

(73) Assignee: AUDI AG, Ingolstadt (DE)

(*) Notice: Subject to any disclaimer, the term of this patent is extended or adjusted under 35 U.S.C. 154(b) by 270 days.

(21) Appl. No.: 16/221,827

(22) Filed: Dec. 17, 2018

(65) Prior Publication Data

US 2019/0184783 A1  Jun. 20, 2019

(30) Foreign Application Priority Data

Dec. 20, 2017 (DE) ........................ 10 2017 223331.1

(51) Int. Cl.
*B60G 17/018* (2006.01)
*B60W 10/22* (2006.01)
(Continued)

(52) U.S. Cl.
CPC ....... *B60G 17/018* (2013.01); *B60G 17/0195* (2013.01); *B60W 10/22* (2013.01); *B60W 30/00* (2013.01); *B60W 50/00* (2013.01); *G08C 15/00* (2013.01); *H04L 12/40189* (2013.01); *H04L 2012/40208* (2013.01)

(58) Field of Classification Search
CPC .. B60G 17/018; B60G 17/0195; B60W 10/22
See application file for complete search history.

(56) References Cited

U.S. PATENT DOCUMENTS

| | | | | |
|---|---|---|---|---|
| 4,107,776 A | * | 8/1978 | Beale | B60W 10/06 477/43 |
| 4,884,227 A | * | 11/1989 | Watanabe | B60T 8/171 702/141 |

(Continued)

FOREIGN PATENT DOCUMENTS

| | | |
|---|---|---|
| DE | 43 05 155 A1 | 8/1994 |
| DE | 199 45 396 A1 | 3/2000 |

(Continued)

OTHER PUBLICATIONS

Mathew Edel "Road Profile Sensor: A detection method for active suspension system"; 18 pages (Year: 2014).*

(Continued)

*Primary Examiner* — Kira Nguyen
(74) *Attorney, Agent, or Firm* — Maier & Maier, PLLC (57) ABSTRACT

A method for controlling a suspension component of a vehicle, in which a control unit of the suspension component continuously generates a plurality of control requirements according to a generation clock frequency, each requirement comprising a control value, for an actuator of the suspension component. A bus system of the vehicle continuously transmits to the actuator the control requirements generated by the control unit according to a transmission clock frequency. The actuator calculates a target output value for the suspension component from the control value of each transmitted control requirement and an actual output value of the suspension component, and adjusts the suspension component corresponding to the calculated target output value.

10 Claims, 4 Drawing Sheets

(51) Int. Cl.
*B60G 17/0195* (2006.01)
*G08C 15/00* (2006.01)
*H04L 12/40* (2006.01)
*B60W 50/00* (2006.01)
*B60W 30/00* (2006.01)

(56) References Cited

U.S. PATENT DOCUMENTS

2014/0297116 A1* 10/2014 Anderson ............ H02K 7/1823
 701/37
2015/0361940 A1* 12/2015 Ishii ................... B60G 17/0195
 701/112
2016/0308687 A1 10/2016 Nickel
2017/0158199 A1* 6/2017 Pallett ................. B60W 30/188

FOREIGN PATENT DOCUMENTS

| DE | 102006047954 A1 | 3/2008 |
|---|---|---|
| DE | 10 2012 202 684 A1 | 8/2013 |
| DE | 102013220374 A1 | 4/2015 |
| JP | 2014000843 A * | 1/2014 |
| WO | 2005/087521 A1 | 9/2005 |

OTHER PUBLICATIONS

The extended European search report dated Jun. 4, 2019 of corresponding European application No. 18 211 537.8 including partial machine-generated English language translation; 10 pages.
Examination Report dated Sep. 13, 2018 of corresponding German application No. 10 2017 223 331.1; 13 pages.
Korean Office Action dated Jan. 20, 2020, in connection with corresponding KR Application No. 10-2018-0166213 (5 pgs., including machine-generated English translation).
Examination Report dated Oct. 26, 2020 in corresponding European Application No. 18 211 537.8; 10 pages including partial machine-generated English-language translation.

* cited by examiner (Prior Art)

CONTROL OF A SUSPENSION COMPONENT OF A VEHICLE

FIELD

The invention relates to a method for controlling a suspension component of a vehicle, in which a control unit of the suspension component continuously generates a plurality of control requirements according to a generation clock frequency, each requirement comprising a control value, for an actuator of the suspension component; a bus system of the vehicle continuously transmits to the actuator the control requirements generated by the control unit according to a transmission clock frequency; and the actuator calculates a target output value for the suspension component from the control value of each transmitted control requirement and an actual output value of the suspension component, and adjusts the suspension component corresponding to the target output value. Further, the invention relates to a suspension component for a vehicle.

BACKGROUND

Vehicles are used for a movement relative to a ground that can be driven over, for the most part a roadway, such as, e.g., a street. Therefore, every vehicle comprises a so-called suspension, which is configured to introduce into the ground below it a gravitational force of the vehicle as well as forces and torques generated by the vehicle and acting on the movement of the vehicle, or to absorb the corresponding counter-forces and counter-torques proceeding from the ground.

Every suspension usually comprises a chassis frame, a plurality of wheels that are introduced on the chassis and that are rotatable around a transverse axis and partially around a yaw axis of the vehicle, which is perpendicular to the transverse axis, as well as a plurality of sensors and/or actuators that are for the most part electrically controlled and assigned to the wheels. The actuators are designed to apply forces and/or torques to the wheels, such as, for example, a drive system and a brake system, or to absorb forces and/or torques operating on the wheels, such as, for example, a spring suspension system.

The suspension thus becomes of central importance with respect to driving safety of the vehicle and driving comfort of the vehicle's passengers. Correspondingly, one aims at further optimizing suspension components and better matching them to each other, in order to ensure the driving safety and the driving comfort even in extreme driving situations and for inexperienced drivers of the vehicle.

Thus, DE 43 05 155 A1 discloses a control system for a suspension component, namely a brake system of a vehicle. The control system comprises a processing unit and actuators associated with the processing unit; wheel brakes of the vehicle are assigned to said actuators. The processing unit classifies driving situations of the vehicle and forms an adjustment signal for selected actuators that is dependent on the class of the driving situation, in order to apply a braking pressure to associated wheel brakes. With the described brake system, a braking distance and a lane deviation are reduced in the case of a braking, and in this way, the stability of the vehicle is improved.

In the case of a so-called active suspension, actuators of the suspension are also controlled independently as a function of a driving situation by a control unit of the vehicle, in order to counteract unfavorable operating states of the vehicle or to ensure a certain desired drive performance of the vehicle, which can also be selected by the driver, as the case may be.

Correspondingly, DE 10 2012 202 684 A1 discloses a method for controlling suspension components of a vehicle, namely wheel drives and wheel brakes. In this method, a drive torque and/or a braking torque are applied to the wheels of the vehicle, if an operating parameter of the suspension that is detected by a sensor and is relative to stability exceeds a pre-determined activation threshold. The stability of the vehicle is improved due to the fact that the control strategy is adapted in a variable manner, wherein, dependent on a driving situation, the activation threshold is decreased and/or an intensity and/or a gradient of a control override is increased.

Of course, in the preceding method, an automatic control override is always generated only after exceeding the activation threshold. In spite of a dynamically adjusted activation threshold that is dependent on the driving situation, the stabilizing control override may consequently be delayed under certain circumstances. The aim is therefore to dynamically fine-tune suspensions based on prognoses relating to upcoming driving situations.

WO 2005/087521 A1 discloses such a method and a corresponding device for adapting a reaction of a vehicle to a driving maneuver aimed at by a driver, for example, traveling along a curve. The aimed-at driving maneuver is recognized on a target value of a manipulated variable of a suspension component, this value being adjusted by the driver: a target steering angle, in this example. Proceeding from the actual value of the manipulated variable of the suspension component, the reaction of the vehicle to an adjusted target value is simulated, and a suitable roll moment distribution of the vehicle is automatically established. In other words, a suspension characteristic and thus a drive performance of the vehicle is carefully changed, adapting to a prognosis.

Modern vehicles comprise central bus systems, with which control units, sensors, and actuators are connected in electrically conducting manner. A central bus system transmits sensor signals that are continually generated by the sensors to the control units according to a specific transmission protocol, and transmits control requirements, which are generated by the control units and comprise control values that are calculated from the sensor signals, from the control units to the actuators. The actuators calculate corresponding target output values from the transmitted control values and adjust the associated suspension component to the calculated target output value, starting from an actual output value of the suspension component.

However, the bus system, the sensors, the control units, and the actuators may each have different clock frequencies. In other words, in many cases, a transmission clock frequency of the bus system, generation clock frequencies of the control units, and calculation clock frequencies of the actuators are different. Based on the lack of synchronicity, but also as a consequence of latency times, different generation and calculation times, as well as in the case of a loss of control requirements caused by interference in the bus system can lead to an undesired course of adjustment of suspension components.

For example, a time course of a control value provided continually by a control unit, despite a uniform generation of corresponding control requirements, in the case of the actuator, can lead to an abrupt adjustment of suspension components, which is detrimental to driving safety and/or to driving comfort. It should be noted in this connection that discontinuities in the course of adjustment having a short duration of 2 ms are perceived by the driver of the vehicle and are felt to be unpleasant or disruptive.

SUMMARY

The object of the invention is therefore to propose a method for controlling a suspension component of a vehicle, which also assures an improved time course of adjustment of the suspension component in the above-described cases. Further, the object of the invention is to create a suspension component for a vehicle that has an improved time course of adjustment.

A subject of the invention is a method for controlling a suspension component of a vehicle, in which a control unit of the suspension component continuously generates a plurality of control requirements according to a generation clock frequency, each requirement comprising a control value, for an actuator of the suspension component; a bus system of the vehicle continuously transmits to the actuator the control requirements generated by the control unit according to a transmission clock frequency; and the actuator calculates a target output value for the suspension component from the control value of each transmitted control requirement and an actual output value of the suspension component, and adjusts the suspension component corresponding to the target output value. The proposed method can be used, for example, by a steering system of a vehicle for adjusting steered wheels around a yaw axis. In this case, the control unit can be formed by a steering angle sensor or a steering torque sensor, and the actuator can comprise a motor for adjusting the steered wheels.

In the method according to the invention, the actuator calculates at least one intermediate output value between two control requirements transmitted in direct succession. The at least one intermediate output value makes possible for the actuator a multi-step, at least a two-step, adjustment of the associated suspension component from the actual output value of the suspension component to the calculated target output value of the suspension component.

In a preferred embodiment, the actuator continually calculates a plurality of intermediate output values between two control requirements transmitted in direct succession, according to a calculation clock frequency. The more intermediate output values are calculated by the actuator, the more uniform, i.e., the smoother can be the adjustment of the suspension component associated with the actuator.

In a very advantageous embodiment, the actuator calculates an intermediate output value in each calculation cycle time. In this way, the greatest possible uniformity, i.e., the best possible smoothness is achieved for the course of adjustment of the associated suspension component.

In another embodiment, the control unit provides each generated control requirement with a specific number of steps, and the actuator calculates at most as many intermediate output values between two control requirements transmitted in direct succession as is specified by the number of steps for the transmitted control requirement. In other words, the control unit can determine the number of the intermediate output values to be calculated by the actuator, and in this way can influence the time course of adjustment of the suspension component actuated by the actuator.

In a preferred embodiment, the actuator calculates the intermediate output values by means of interpolating between the actual output value and the target output value, in particular by means of linear interpolation. Interpolation is a widely used and well-proven method for determining intermediate values. Corresponding interpolation algorithms are simple to execute and to implement.

In one embodiment, the calculation clock frequency of the actuator is higher than the transmission clock frequency of the bus system. This is the case many times and thus permits a smoother adjustment of the suspension component actuated by the actuator than would be possible only by means of the control requirements transmitted by the bus system without additional intermediate output values.

In other embodiments, the control unit provides the number of steps to be smaller than the quotient of the transmission cycle time and the calculation cycle time. The quotient corresponds to the number of maximum possible intermediate output values. A number of steps that is smaller than the quotient leads to obtaining the target output value prior to the transmission of the next control requirement. This performance of the actuator can be designated as rapid interpolation.

In alternative embodiments, the control unit provides the number of steps equal to or greater than the quotient of the transmission cycle time and the calculation cycle time. A number of steps that is equal to the quotient leads to obtaining the target output value when the next control requirement is transmitted, i.e., exactly adapting to the transmission cycle time. This interpolation performance of the actuator can be designated as linear interpolation.

A number of steps that is greater than the quotient prevents obaining the target output value until the next control requirement is transmitted, i.e., the actual output value of the suspension component has still not reached the required target output value at this point in time. Therefore, this behavior of the actuator can be designated as slow interpolation.

In advantageous embodiments, the transmission cycle time of the bus system is a whole-number multiple of the calculation cycle time of the actuator, and, in particular, provides the control unit with the number of steps equal to the quotient of the transmission cycle time and the calculation cycle time. In this pattern, a particularly simple linear adjustment performance of the suspension component results between two successive control requirements.

The subject of the invention is also a suspension component of a vehicle, having a control unit that can be connected to a bus system of the vehicle, said control unit being configured to continually generate a plurality of control requirements, each of which comprises a control value, according to a generation clock frequency, and having an actuator that can be connected to the bus system of the vehicle, said actuator being configured to calculate, from the control value of each control requirement transmitted by means of the bus system and an actual output value of the suspension component, a target output value for the suspension component, and to adjust the suspension component corresponding to the calculated target output value. The suspension component may involve, for example, a steering system that comprises a sensor for angle of rotation or a torque sensor as control unit and a motor as actuator.

In the case of the suspension component according to the invention, the actuator is configured to calculate at least one intermediate output value between two control requirements transmitted in direct succession, in particular, in a method according to the invention. The actuator configured in this way makes possible a uniform, i.e., a smooth adjustment of the suspension component, whereby a high driving safety of the vehicle and a high driving comfort for passengers of the vehicle are achieved.

BRIEF DESCRIPTION OF THE DRAWINGS

The invention is presented schematically in the drawings on the basis of an embodiment, and is described further with reference to the drawings. Herein.

DETAILED DESCRIPTION

The method described below is executed by a suspension component of a vehicle. The suspension component, for example, a steering system of the vehicle, comprises a control unit that can be connected to a bus system of the vehicle. The control unit is configured to continually generate a plurality of control requirements, each of which comprises a control value, according to a generation clock frequency. Further, the suspension component comprises an actuator that can be connected to the bus system of the vehicle. The actuator is configured to calculate a target output value for the suspension component from the control value of each control requirement transmitted by means of the bus system and an actual output value of the suspension component, and to adjust the suspension component correspondingly to the calculated target output value.

Figure 1:
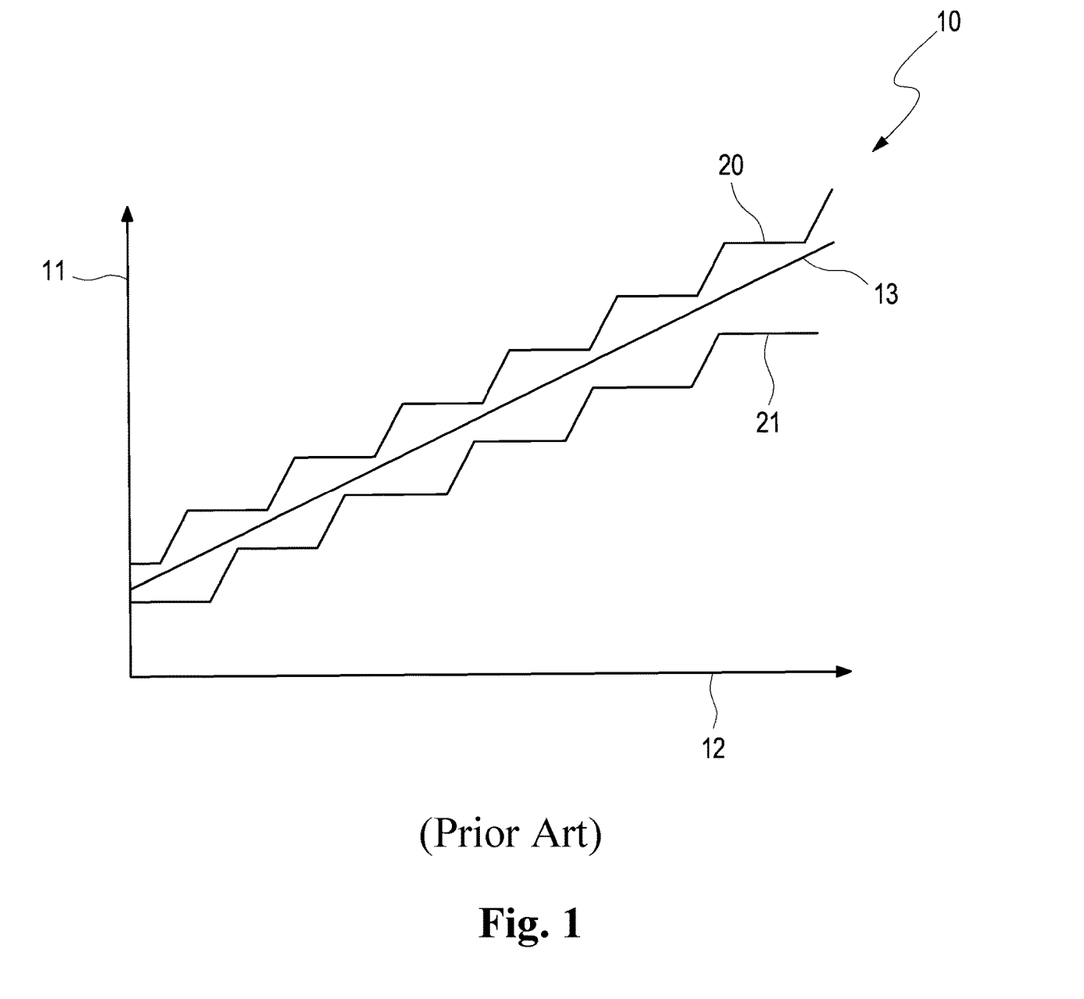
FIG. 1 shows in a diagram a time course of a control value and a target output value in a method according to the prior art.

FIG. 1 shows in a diagram 10 a time course of a control value 20 and a target output value 21 in a method according to the prior art. In diagram 10, in only symbolic units, control values 20 transmitted from the control unit by way of the bus system, or of output values 21 calculated by the actuator, are plotted on the ordinate 11, and a time course is plotted on the abscissa 12. For clarity, a linear course 13 is depicted.

In comparison to the linear course 13, on the one hand, it is clear that the control value 20—apart from unavoidable gaps due to discrete transmission cycles of the bus system— has a linear time course. On the other hand, it can be recognized that the target output value 21 calculated by the actuator, on the one hand, also naturally has discontinuities, and, on the other hand, also deviates from the required linear time course of the control value 20. The latter is to be attributed to the lack of synchronicity between the transmission clock cycles of the bus system and the calculation clock cycles of the actuator, as well as to latency times and losses of control requirements in the bus system.

Figure 2:
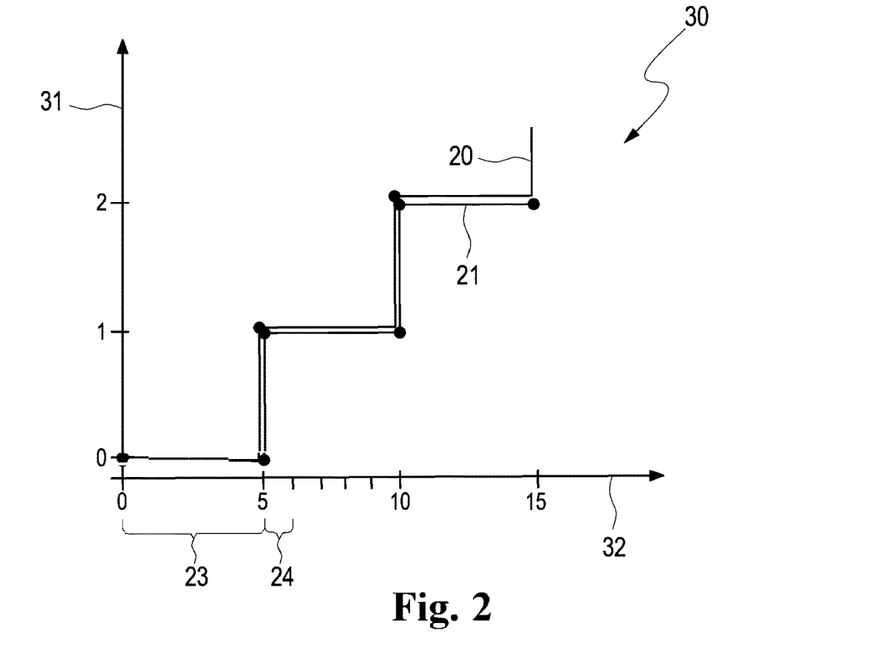
FIG. 2 shows in a diagram a first time course of a target output value in an embodiment of the method according to the invention.

In a diagram 30, FIG. 2 shows a first time course of a target output value 21 in an embodiment of the method according to the invention. In diagram 30, control values 20 or output values 21 are plotted on ordinate 31 in only symbolic units and a time course in milliseconds (ms) is plotted on the abscissa 32. As can be derived from diagram 30, a transmission cycle 23 of the bus system has a duration of 5 ms. The duration of a calculation cycle 24 of the actuator, in contrast, amounts to 1 ms.

Therefore, the transmission cycle time 23 of the bus system is a whole-number multiple of the calculation cycle time 24 of the actuator, and a quotient of the transmission cycle time 23 and the calculation cycle time 24 amounts to 5. The control requirements generated by the control unit and transmitted by way of the bus system comprise a number of steps with the value 0. Correspondingly, the actuator does not calculate any intermediate values during this time course of the target output value 21, and the target output value 21 abruptly follows the control values 20.

The time course of the target output value 21 shown in diagram 30 can thus represent a borderline case of the method according to the invention, with which a time course for the target output value 21 can be conducted as in the prior art. From the perspective of the method according to the invention, this borderline case can be designated as abrupt "interpolation".

Figure 3:
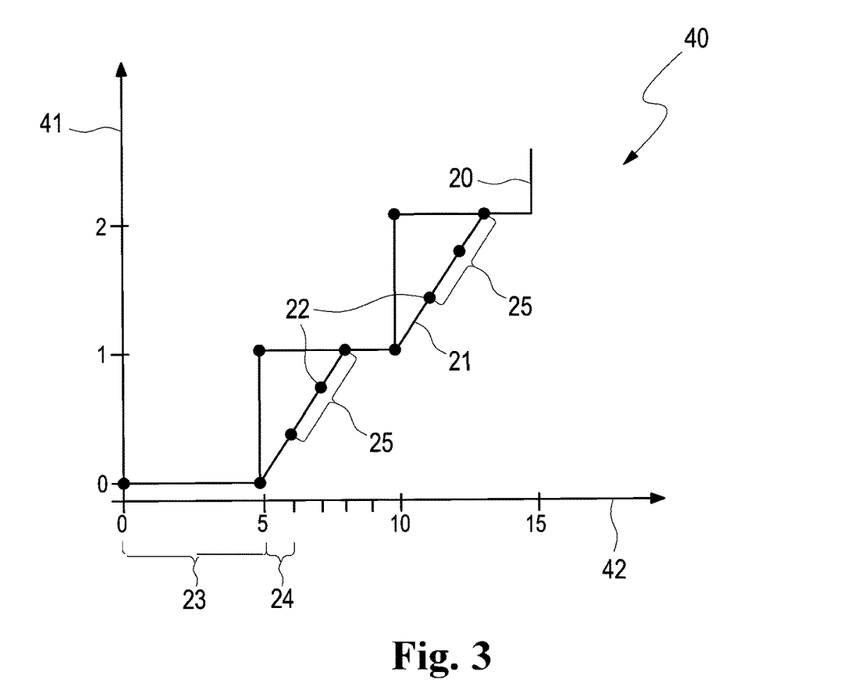
FIG. 3 shows in a diagram a second time course of a target output value in the embodiment of the method according to the invention.

In a diagram 40, FIG. 3 shows a second time course of a target output value 21 in the embodiment of the method according to the invention. In diagram 40, control values 20 or output values 21 are plotted on the ordinate 41 in only symbolic units, and a time course in milliseconds is plotted on the abscissa 42. As can be derived from diagram 40, a transmission cycle 23 of the bus system has a duration of 5 ms. The duration of a calculation cycle 24 of the actuator, in contrast, amounts to 1 ms.

Therefore, the transmission cycle time 23 of the bus system is a whole-number multiple of the calculation cycle time 24 of the actuator, and a quotient of the transmission cycle time 23 and the calculation cycle time 24 amounts to 5. The control requirements generated by the control unit and transmitted by way of the bus system comprise a number of steps 25 with the value 3. The control unit therefore provides a number of steps 25 that is smaller than the quotient of the transmission cycle time 23 and the calculation cycle time 24.

Correspondingly, the actuator calculates an intermediate value 22 each time in three calculation cycle times 24, wherein the target output value corresponding to the control value 20 is obtained after three calculation cycle times 24 and consequently prior to the transmission of the next control requirement in each case. This performance of the actuator can be designated as rapid interpolation and avoids the abrupt time course shown in FIG. 2.

Figure 4:
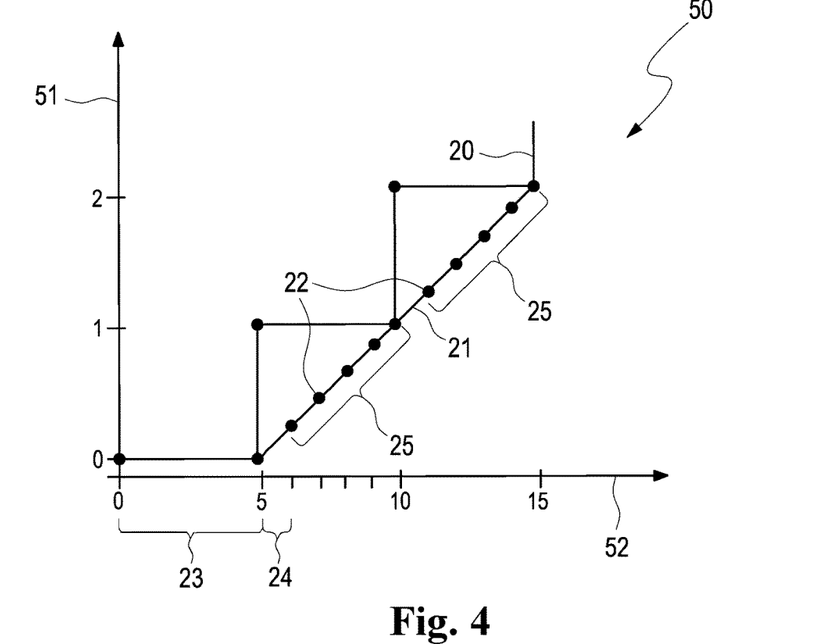
FIG. 4 shows in a diagram a third time course of a target output value in the embodiment of the method according to the invention.

In a diagram 50, FIG. 4 shows a third time course of a target output value 21 in the embodiment of the method according to the invention. In diagram 50, control values 20 or output values 21 are plotted on the ordinate 51 in only symbolic units, and a time course in milliseconds is plotted on the abscissa 52. As can be derived from diagram 50, a transmission cycle 23 of the bus system has a duration of 5 ms. The duration of a calculation cycle 24 of the actuator, in contrast, amounts to 1 ms.

Therefore, the transmission cycle time 23 of the bus system is a whole-number multiple of the calculation cycle time 24 of the actuator, and a quotient of the transmission cycle time 23 and the calculation cycle time 24 amounts to 5. The control requirements generated by the control unit and transmitted by way of the bus system comprise a number of steps 25 with the value 5. The control unit therefore provides a number of steps 25 that is equal to the quotient of the transmission cycle time 23 and the calculation cycle time 23.

Correspondingly, the actuator calculates an intermediate value 22 each time in five calculation cycle times, wherein the target output value corresponding to the control value 20 is obtained after five calculation cycle times 24 and during the transmission of the next control requirement in each case. This performance of the actuator can be designated as linear interpolation and optimally approximates the original linear time course of the control value 20.

Figure 5:
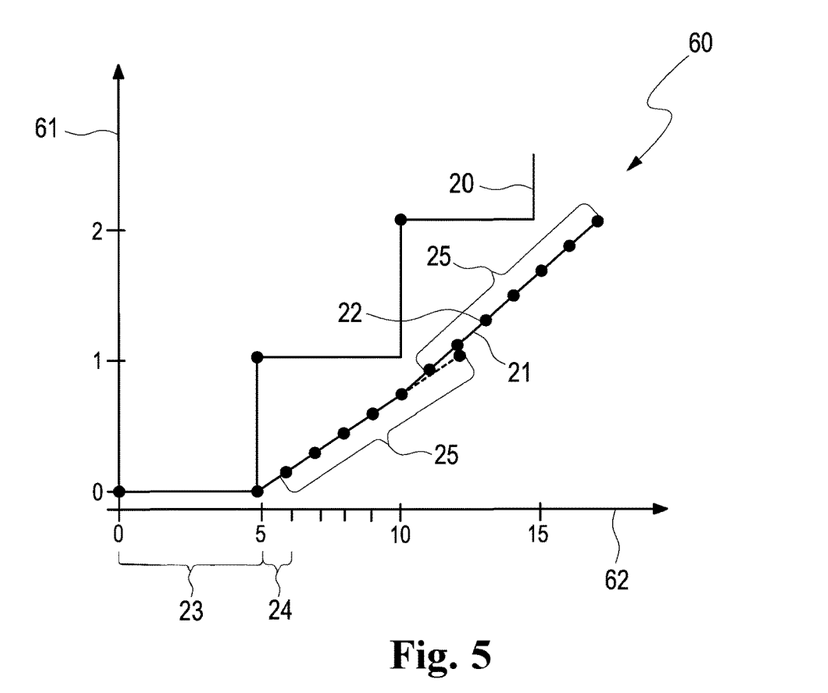
FIG. 5 shows in a diagram a fourth time course of a target output value in the embodiment of the method according to the invention.

In a diagram 60, FIG. 5 shows a fourth time course of a target output value 21 in the embodiment of the method according to the invention. In diagram 60, control values 20 or output values 21 are plotted on the ordinate 61 in only symbolic units, and a time course in milliseconds is plotted on the abscissa 62. As can be derived from diagram 60, a transmission cycle 23 of the bus system has a duration of 5 ms. The duration of a calculation cycle 24 of the actuator, in contrast, amounts to 1 ms.

Therefore, the transmission cycle time 23 of the bus system is a whole-number multiple of the calculation cycle time 24 of the actuator, and a quotient of the transmission cycle time 23 and the calculation cycle time 24 amounts to 5. The control requirements generated by the control unit and transmitted by way of the bus system comprise a number of steps 25 with the value 7. The control unit therefore provides a number of steps 25 that is greater than the quotient of the transmission cycle time 23 and the calculation cycle time 24.

Correspondingly, the actuator calculates an intermediate value 22 each time starting from seven calculation cycle times 24, wherein the target output value corresponding to the control value 20 would thus also be obtained only after calculation cycle times 24 and thus after the transmission of the next control requirement in each case. Consequently, the output value obtained after five calculation cycle times 24 and deviating from the envisaged target output value is taken as the actual output value for a calculation of the actuator following the next control requirement. This performance of the actuator can be designated as slow interpolation.

Figure 6:
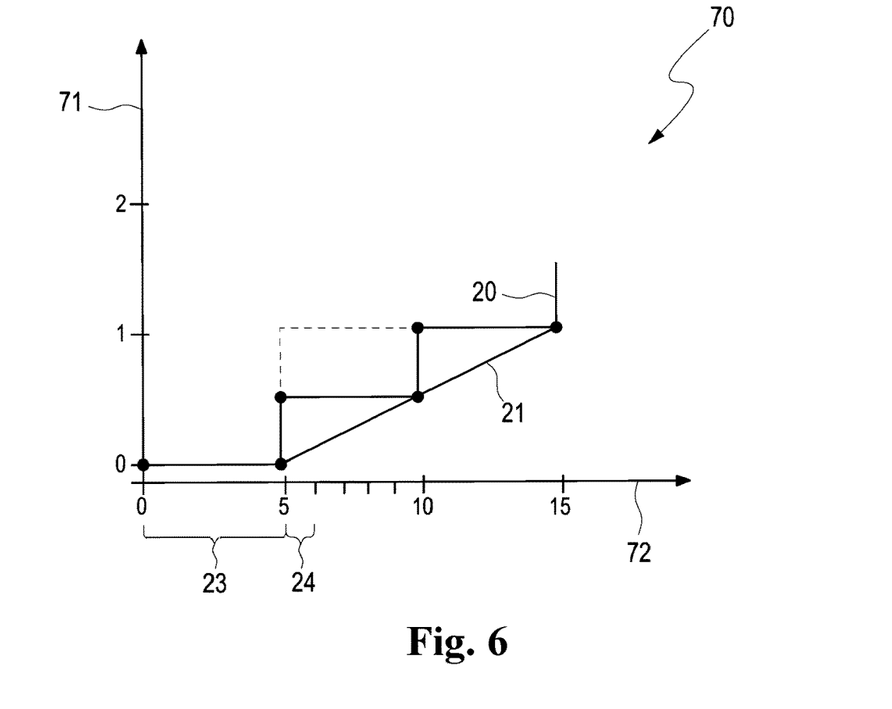
FIG. 6 shows in a diagram a fifth time course of a target output value in the embodiment of the method according to the invention.

In a diagram 70, FIG. 6 shows a fifth time course of a target output value 21 in the embodiment of the method according to the invention. In diagram 70, control values 20 or output values 21 are plotted on ordinate 71 in only symbolic units and a time course in milliseconds (ms) is plotted on the abscissa 72. As can be derived from diagram 70, a transmission cycle 23 of the bus system has a duration of 5 ms. The duration of a calculation cycle 24 of the actuator, in contrast, amounts to 1 ms.

Therefore, the transmission cycle time 23 of the bus system is a whole-number multiple of the calculation cycle time 24 of the actuator, and a quotient of the transmission cycle time 23 and the calculation cycle time 24 amounts to 5. The time course that is shown differs from the time course shown in FIG. 4, due to the fact that the rate of change of the control value 20 is cut in half.

Figure 7:
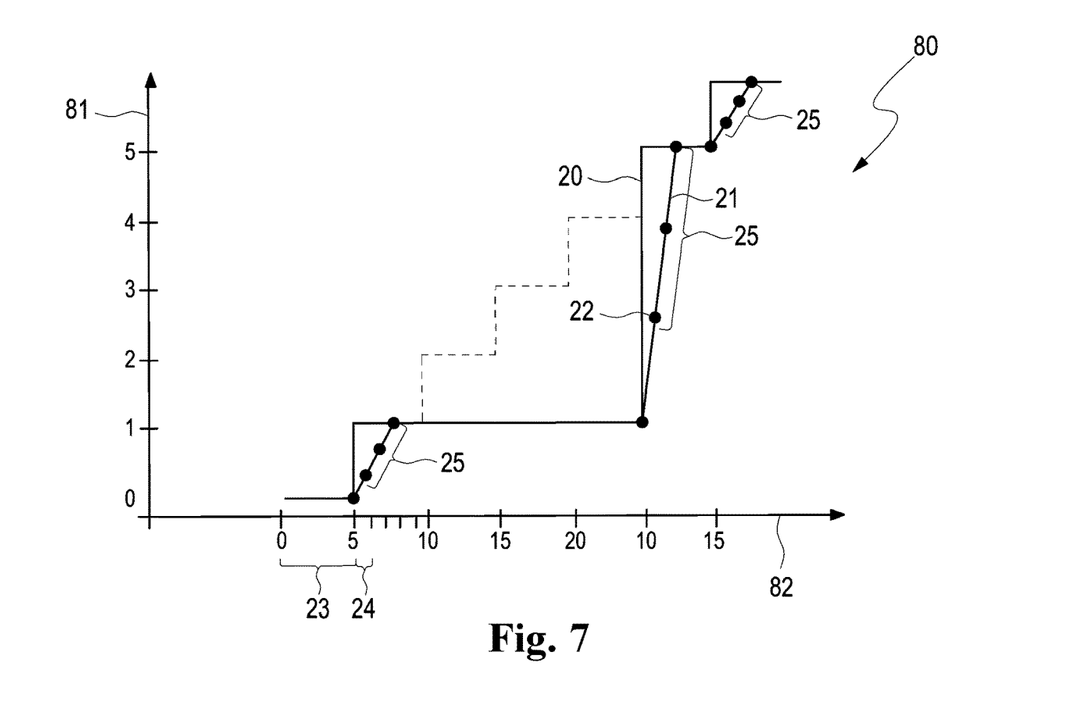
FIG. 7 shows in a diagram a sixth time course of a target output value in the embodiment of the method according to the invention.

In a diagram 80, FIG. 7 shows a sixth time course of a target output value 21 in the embodiment of the method according to the invention. In diagram 80, control values 20 or output values 21 are plotted on ordinate 81 in only symbolic units and a time course in milliseconds (ms) is plotted on the abscissa 82. As can be derived from diagram 80, a transmission cycle 23 of the bus system has a duration of 5 ms. The duration of a calculation cycle 24 of the actuator, in contrast, amounts to 1 ms.

Therefore, the transmission cycle time 23 of the bus system is a whole-number multiple of the calculation cycle time 24 of the actuator, and a quotient of the transmission cycle time 23 and the calculation cycle time 24 amounts to 5. The control requirements generated by the control unit and transmitted by way of the bus system comprise a number of steps 25 with the value 3. Therefore, a rapid interpolation is present, as shown in the diagram 80.

Deviating from the time course shown in FIG. 3, here, of course, three control requirements are left out, for example, as a consequence of disruptions of the bus system, between the time points of 10 ms and 25 ms, before, starting from the time point 25, control requirements with control values 20 are transmitted again as intended. Due to the rapid interpolation, the large jump to time point 25 is correspondingly mitigated.

A substantial advantage of the method according to the invention consists in the fact that the control unit can determine the interpolation performance of the actuator by varying the control requirements with respect to the number of steps 25, in order to appropriately take into consideration current driving situations of the vehicle In this way, the actuator is induced to interpolate any discontinuities of the control values 20 comprised by the control requirements by calculating intermediate output values 22 flexibly, whereby a correspondingly smooth adjustment of the suspension component actuated by the actuator is achieved. This is accompanied by an improvement in vehicle safety and an increase in driving comfort.

The invention claimed is:

1. A method for controlling a suspension component of a vehicle, comprising:
   a control unit of the suspension component continuously generates a plurality of control requirements according to a generation clock frequency, each requirement having a control value, for an actuator of the suspension component;
   a bus system of the vehicle continuously transmits to the actuator the control requirements generated by the control unit according to a transmission clock frequency;
   the actuator calculates a target output value for the suspension component from the control value of each transmitted control requirement and an actual output value of the suspension component, and adjusts the suspension component corresponding to the calculated target output value; and in which
   the actuator calculates at least one intermediate output value between two control requirements transmitted in direct succession.

2. The method according to claim 1, wherein the actuator continually calculates a plurality of intermediate output values between two control requirements transmitted in direct succession, according to a calculation clock frequency.

3. The method according to claim 2, wherein the actuator calculates the intermediate output values by interpolating between the actual output value and the target output value, in particular by linear interpolation.

4. The method according to claim 1, wherein the actuator calculates an intermediate output value in each calculation cycle time.

5. The method according to claim 1, wherein the control unit provides each generated control requirement with a specific number of steps, and the actuator calculates at most as many intermediate output values between two control requirements transmitted in direct succession as is specified by the number of steps for the transmitted control requirement.

6. The method according to claim 5, wherein the calculation clock frequency of the actuator is higher than the transmission clock frequency of the bus system.

7. The method according to claim 6, wherein the control unit provides the number of steps to be smaller than the quotient of the transmission cycle time and the calculation cycle time.

8. The method according to claim 6, wherein the control unit provides the number of steps equal to or greater than the quotient of the transmission cycle time and the calculation cycle time.

9. The method according to claim 6, wherein the transmission cycle time of the bus system is a whole-number multiple of the calculation cycle time of the actuator, and, in particular, the control unit provides the number of steps equal to the quotient of the transmission cycle time and the calculation cycle time.

10. A suspension component of a vehicle, comprising:

a control unit that can be connected to a bus system of the vehicle, said control unit being configured to continually generate a plurality of control requirements, each of which including a control value, according to a generation clock frequency, and having an actuator that can be connected to the bus system of the vehicle, said actuator being configured to calculate, from the control value of each control requirement transmitted by the bus system and an actual output value of the suspension component, a target output value for the suspension component, and to adjust the suspension component corresponding to the calculated target output value, in which the actuator is configured to calculate at least one intermediate output value between two control requirements transmitted in direct succession.

\* \* \* \* \*